(12) United States Patent
Agombar et al.

(10) Patent No.: US 8,990,529 B2
(45) Date of Patent: Mar. 24, 2015

(54) METHOD FOR OPTIMIZING CLEANING OF MAPS IN FLASHCOPY CASCADES CONTAINING INCREMENTAL MAPS

(71) Applicant: International Business Machines Corporation, Armonk, NY (US)

(72) Inventors: John P. Agombar, Winchester (GB); Christopher B. E. Beeken, Chandlers Ford (GB); Carlos F. Fuente, Bishops Waltham (GB); William J. Scales, Porchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/202,373

(22) Filed: Mar. 10, 2014

(65) Prior Publication Data

US 2014/0189233 A1    Jul. 3, 2014

Related U.S. Application Data

(63) Continuation of application No. 13/432,726, filed on Mar. 28, 2012, now Pat. No. 8,688,937, which is a continuation of application No. 12/247,642, filed on Oct. 8, 2008, now Pat. No. 8,230,185.

(51) Int. Cl.
*G06F 12/16* (2006.01)
*G06F 3/06* (2006.01)
*G06F 11/14* (2006.01)

(52) U.S. Cl.
CPC ............ *G06F 3/065* (2013.01); *G06F 11/1451* (2013.01); *G06F 3/0604* (2013.01); *G06F 3/0689* (2013.01); *G06F 2201/84* (2013.01)
USPC ............................ 711/162; 711/161; 714/6.23

(58) Field of Classification Search
CPC ........................ G06F 11/1456; G06F 11/2074
USPC .................................. 711/161, 162; 714/6.23
See application file for complete search history.

(56) References Cited

U.S. PATENT DOCUMENTS 5,089,958 A    2/1992    Horton et al.
5,522,037 A    5/1996    Kitagawa et al.
(Continued)

FOREIGN PATENT DOCUMENTS

CN    1726472    1/2006
CN    1926819    3/2007
(Continued)

OTHER PUBLICATIONS

Microsoft Technet, "How Volume Shadow Copy Service Works", technet.microsoft.com/en-us/library/cc785914(d=printer,v=WS.10).aspx, Mar. 28, 2003; 8 pages.
(Continued)

*Primary Examiner* — Jae Yu
(74) *Attorney, Agent, or Firm* — Randall Bluestone; Roberts Mlotkowski Safran & Cole, P.C.

(57) ABSTRACT

A method for optimizing cleaning of maps in storage cascades includes determining whether a target disk of a map contains data unavailable to a downstream disk from an upstream disk in a cascade and detect whether the downstream disk has a copy of the data. Additionally, the method includes copying the data from the target disk to the downstream disk, if the target disk of the map contains data unavailable to the downstream disk from the upstream disk and the downstream disk does not have the copy of the data. Furthermore, the method includes copying the data from the target disk to the downstream disk, if the target disk of the map does not contain data unavailable to the downstream disk from the upstream disk or the downstream disk does have the copy of the data. Moreover, the method includes removing the map from the cascade.

12 Claims, 7 Drawing Sheets

(56) References Cited

U.S. PATENT DOCUMENTS

| | | |
|---|---|---|
| 6,859,888 B2 | 2/2005 | Furuya et al. |
| 6,889,228 B1 | 5/2005 | Federwisch |
| 7,315,917 B2 | 1/2008 | Bennett et al. |
| 7,340,490 B2 | 3/2008 | Teloh et al. |
| 7,360,048 B2 | 4/2008 | Agombar et al. |
| 7,395,378 B1 | 7/2008 | Pendharkar et al. |
| 7,636,824 B1 | 12/2009 | Tormasov |
| 7,669,024 B2 | 2/2010 | Fuente |
| 7,733,782 B2 | 6/2010 | Sunnell et al. |
| 7,904,684 B2 | 3/2011 | Werner et al. |
| 2003/0191916 A1* | 10/2003 | McBrearty et al. ........... 711/162 |
| 2004/0181639 A1 | 9/2004 | Jarvis et al. |
| 2004/0205304 A1 | 10/2004 | McKenney et al. |
| 2005/0187982 A1 | 8/2005 | Sato |
| 2005/0210193 A1 | 9/2005 | Nagata |
| 2005/0228957 A1 | 10/2005 | Satoyama et al. |
| 2006/0075200 A1 | 4/2006 | Satoyama et al. |
| 2006/0075293 A1 | 4/2006 | Bodlaender |
| 2006/0114831 A1 | 6/2006 | Buduma et al. |
| 2006/0139697 A1 | 6/2006 | Fuente |
| 2006/0143413 A1 | 6/2006 | Agombar et al. |
| 2006/0200640 A1 | 9/2006 | Agombar et al. |
| 2008/0189482 A1 | 8/2008 | Fuente |
| 2008/0215837 A1 | 9/2008 | Agombar et al. |
| 2009/0037766 A1 | 2/2009 | Agombar et al. |
| 2009/0106332 A1 | 4/2009 | Agombar et al. |
| 2009/0319735 A1 | 12/2009 | Agombar et al. |
| 2010/0036996 A1 | 2/2010 | Agombar et al. |
| 2010/0088468 A1 | 4/2010 | Agombar et al. |
| 2010/0146204 A1 | 6/2010 | Agombar et al. |
| 2010/0250882 A1 | 9/2010 | Hutchison et al. |
| 2010/0318757 A1 | 12/2010 | Beeken et al. |
| 2011/0208932 A1 | 8/2011 | Agombar et al. |
| 2011/0307675 A1 | 12/2011 | Kano |
| 2013/0346710 A1 | 12/2013 | Agombar et al. |
| 2013/0346711 A1 | 12/2013 | Beeken et al. |

FOREIGN PATENT DOCUMENTS

| | | |
|---|---|---|
| JP | 2005235058 | 9/2005 |
| JP | 2006107162 | 4/2006 |
| JP | 2010517188 | 5/2010 |

OTHER PUBLICATIONS

IBM, "FlashCopy Mappings", http://publib.boulder.ibm.com/infocenter/storwize/ic/index.jsp?topic=%2Fcom.ibm.storwize.v7000.doc%2Fsvc_flashmapovr_21i9wu.html, Retrieved on Sep. 8, 2011; 5 pages.

Rumney, Dan, "Visualizing IBM SAN Volume Controller FlashCopy Mappings", http://www.danrumney.co.uk/papers/visualfcms/visualisefcms.pdf, Jan. 22, 2009; 14 pages.

Wikipedia, "Inode", en.wikipedia.org/w/index.php?title=Inode&oldid=494679136, May 22, 2012; 3 pages.

* cited by examiner

METHOD FOR OPTIMIZING CLEANING OF MAPS IN FLASHCOPY CASCADES CONTAINING INCREMENTAL MAPS

FIELD OF THE INVENTION

The present invention generally relates to FlashCopy cascades, and more particularly, to a method for optimizing cleaning of maps in FlashCopy cascades containing incremental maps.

BACKGROUND

FlashCopy® is a feature supported on various storage devices that allows nearly instantaneous point-in-time copies of entire logical volumes or data sets to be made. (FlashCopy is a registered trademark of International Business Machines Corporation in the United States, other countries, or both.) Thus, the FlashCopy function enables one to make point-in-time, full volume copies of data, with the copies immediately available for read or write access. The copy may be used with standard backup tools that are available in a computing environment to create backup copies on tape.

Moreover, FlashCopy creates a point-in-time copy of a source volume on a target volume. When a FlashCopy operation is initiated, a FlashCopy relationship is created between the source volume and the target volume. Thus, a FlashCopy relationship is a "mapping" of the FlashCopy source volume and the FlashCopy target volume. This mapping allows a point-in-time copy of that source volume to be copied to the associated target volume. The FlashCopy relationship exists between this volume pair from the time that a FlashCopy operation is initiated until the storage unit copies all data from the source volume to the target volume or until the FlashCopy relationship is deleted. Moreover, a cascaded FlashCopy configuration is one where the source disk of one map is the target disk of another map. For example, there may be one map defined with source disk A and target disk B, and another map defined with source disk B and target disk C. The cascade would include the three disks A, B and C and the two maps. Once the copies are made, the copies are immediately available for both read and write access.

When the data is physically copied, a background process copies tracks (or grains) from the source volume to the target volume. The amount of time that it takes to complete the background copy depends on, for example: the amount of data being copied; the number of background copy processes that are occurring and the other activities that are occurring on the storage system, amongst other factors.

When a FlashCopy operation copies data from a source volume to a target volume, that source volume can be involved in more than one FlashCopy relationship at the same time (known as a multiple relationship FlashCopy). That is, the multiple relationship FlashCopy function allows a source volume to have multiple targets simultaneously. If a track on a volume is not a target track of an existing FlashCopy relationship, it can become the target in a new FlashCopy relationship.

Thus, for example, if multiple copies of the same data are required, this multiple relationship FlashCopy function allows a single source volume to be copied multiple (e.g., up to twelve) times to different target volumes as soon as a FlashCopy volume is established. For example, suppose a FlashCopy is used to copy volume A to volume B. As soon as that FlashCopy relationship is established, volume A may be copied to volume C. Once that relationship is established, volume A may be copied to volume D, and so on. Additionally, multiple sessions within a single volume are possible.

Multiple target FlashCopy, when implemented using a cascade methodology, offers great scalability in terms of number of copies whilst also giving the user the ability to make copies of copies. However, multiple target FlashCopy when implemented using a cascade methodology also introduces the undesirable concept of having to "clean" a FlashCopy map before it can be removed from a cascade. The cleaning process ensures that no disk in the cascade is dependent on the target disk of the map being removed. The cleaning process can take a considerable amount of time to complete.

Additionally, FlashCopy may utilize space-efficient volumes. The FlashCopy space-efficient (SE) feature allocates storage space on an "as-needed" basis by using space on a target volume only when it actually copies tracks (or grains) from the source volume to the target volume. Without space-efficient volumes, the FlashCopy function requires that all the space on a target volume be allocated and available even if no data is copied there. However, with space-efficient volumes, FlashCopy uses only the number of tracks (or grains) that are required to write the data that is changed during the lifetime of the FlashCopy relationship, so the allocation of space is on an "as-needed" basis. Because space-efficient FlashCopy volumes do not require a target volume that is the exact size of the source volume, the FlashCopy SE feature increases the potential for a more effective use of system storage.

The space-efficiency attribute may be defined for the target volumes during the volume creation process. A space-efficient volume can be created from any extent pool that has already-created space-efficient storage. As long as the space-efficient source and target volumes have been created and are available, they can be selected when the FlashCopy relationship is created.

Thus, as described above, the FlashCopy SE feature increases the potential for a more effective use of system storage. However, combining multiple target FlashCopy with space efficient volumes adds another problem to the cleaning process. That is, consider the situation where a customer has a daily backup copy, wherein every day, for example, the customer makes a new space efficient copy of this backup. Cascade and multiple target FlashCopy and space efficient volumes enables this setup. Also, consider that in order to reduce time taken to complete the daily backup, the FlashCopy map is made incremental. The problem with the cleaning process in this scenario is that the cleaning process will need to copy all the data from the daily backup to the latest space efficient copy. However, since the daily copy is a complete copy this will require that the whole of the space efficient copy will be allocated. Thus, with this scenario, the utilization of the space efficient volume is "broken" by the cascaded cleaning methodology.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable medium having programming instructions. The programming instructions are operable to determine whether a target disk of a map contains data unavailable to a downstream disk from an upstream disk in a FlashCopy cascade and detect whether the downstream disk has a copy of the data. Additionally, the programming instructions are operable to copy the data from the target disk to the downstream disk, if the target disk of the map contains data unavailable to the downstream disk from the upstream disk and the downstream disk does not have the copy of the data. Furthermore, the programming instructions are operable to refrain from copying the data from the target disk to the downstream disk, if the target disk of the map does not contain data unavailable to the downstream disk from the upstream disk or the downstream disk does have the copy of the data. Moreover, the programming instructions are operable to remove the map from the FlashCopy cascade.

In another aspect of the invention, a system comprises a bitmap tool operable to detect bitmap values for a map in a FlashCopy cascade and determine if a FlashCopy cleaning process is necessary based on the detecting, and, if so, perform the FlashCopy cleaning process. Additionally, the bitmap tool is operable to modify bitmap values for a downstream map in the FlashCopy cascade when the FlashCopy cleaning process is performed. Furthermore, the bitmap tool is operable to remove the map from the FlashCopy cascade.

In an additional aspect of the invention, a computer program product comprising a computer usable storage medium having readable program code embodied in the medium is provided. The computer program product includes at least one component operable to determine whether a target disk of a map contains data unavailable to a downstream disk from an upstream disk in a cascade and detect whether the downstream disk has a copy of the data. Additionally, the at least one component is operable to copy the data from the target disk to the downstream disk, if the target disk of the map contains data unavailable to the downstream disk from the upstream disk and the downstream disk does not have the copy of the data. Furthermore, at least one component operable to refrain from copying the data from the target disk to the downstream disk, if the target disk of the map does not contain data unavailable to the downstream disk from the upstream disk or the downstream disk does have the copy of the data. Moreover, at least one component is operable to remove the map from the cascade.

In a further aspect of the invention, a method comprises providing a computer infrastructure operable to determine whether a target disk of a map contains data unavailable to a downstream disk from an upstream disk in a FlashCopy cascade and detect whether the downstream disk has a copy of the data. Additionally, the computer infrastructure is operable to copy the data from the target disk to the downstream disk, if the target disk of the map contains data unavailable to the downstream disk from upstream disk and the downstream disk does not have the copy of the data. Furthermore, the computer infrastructure is operable to refrain from copying the data from the target disk to the downstream disk, if the target disk of the map does not contain data unavailable to the downstream disk from the upstream disk or the downstream disk does have the copy of the data. Moreover, the computer infrastructure is operable to update a downstream map if the copying the data from the target disk to the downstream disk is performed to reflect a mapping from the downstream disk to a new source disk. Additionally, the computer infrastructure is operable to remove the map from the FlashCopy cascade.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
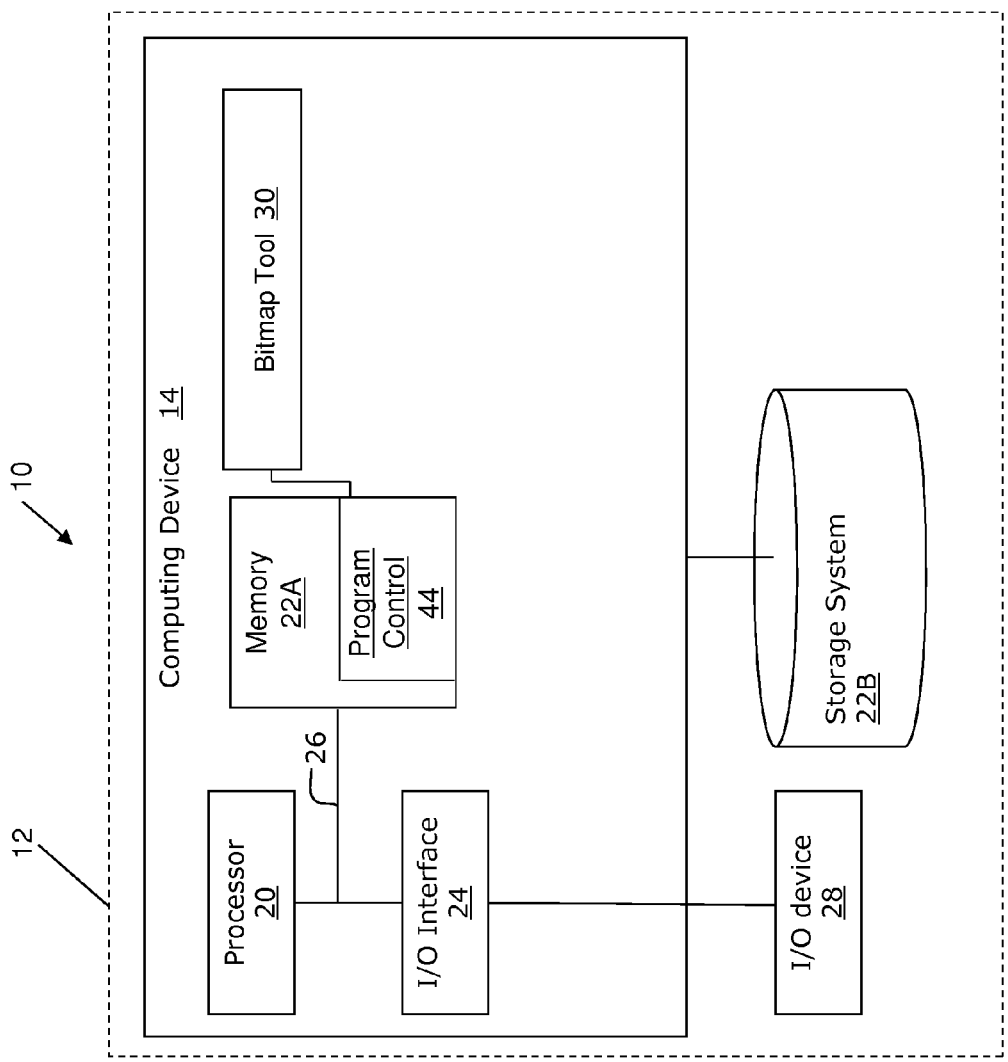
FIG. 1 shows an illustrative environment for implementing the steps in accordance with the invention.

The present invention generally relates to FlashCopy cascades, and more particularly, to a method for optimizing cleaning of maps in FlashCopy cascades containing incremental maps. By implementing the present invention, the time taken to clean a FlashCopy map when there are incremental maps in the cascade may be decreased. Additionally, implementing the present invention may limit the cleaning of grains on space efficient copies to prevent unnecessary allocation of space.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a bitmap tool 30. The bitmap tool 30 is operable to detect bitmap values of maps, alter bitmap values of the maps and initiate a FlashCopy process, e.g., the processes described herein. The bitmap tool 30 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 having program code controls the bitmap tool 30. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Incremental Maps

In accordance with aspects of the invention, an incremental map provides a mechanism that allows a tracking to the differences between a source disk and a target disk. As described above, the cleaning of a FlashCopy map involves reading data that is on the target disk and writing it to the next downstream disk in the cascade that requires that data. Now, if the downstream disk is space efficient, any data written to the downstream disk will cause space to be allocated on that disk. However, if the data on the target of the cleaning map is the same as the data on the source of the cleaning map, then in accordance with aspects of the invention, this data need not be cleaned because once the map between the source disk and the target disk has been removed, the downstream disk can still get the data from the source disk.

Figure 2:
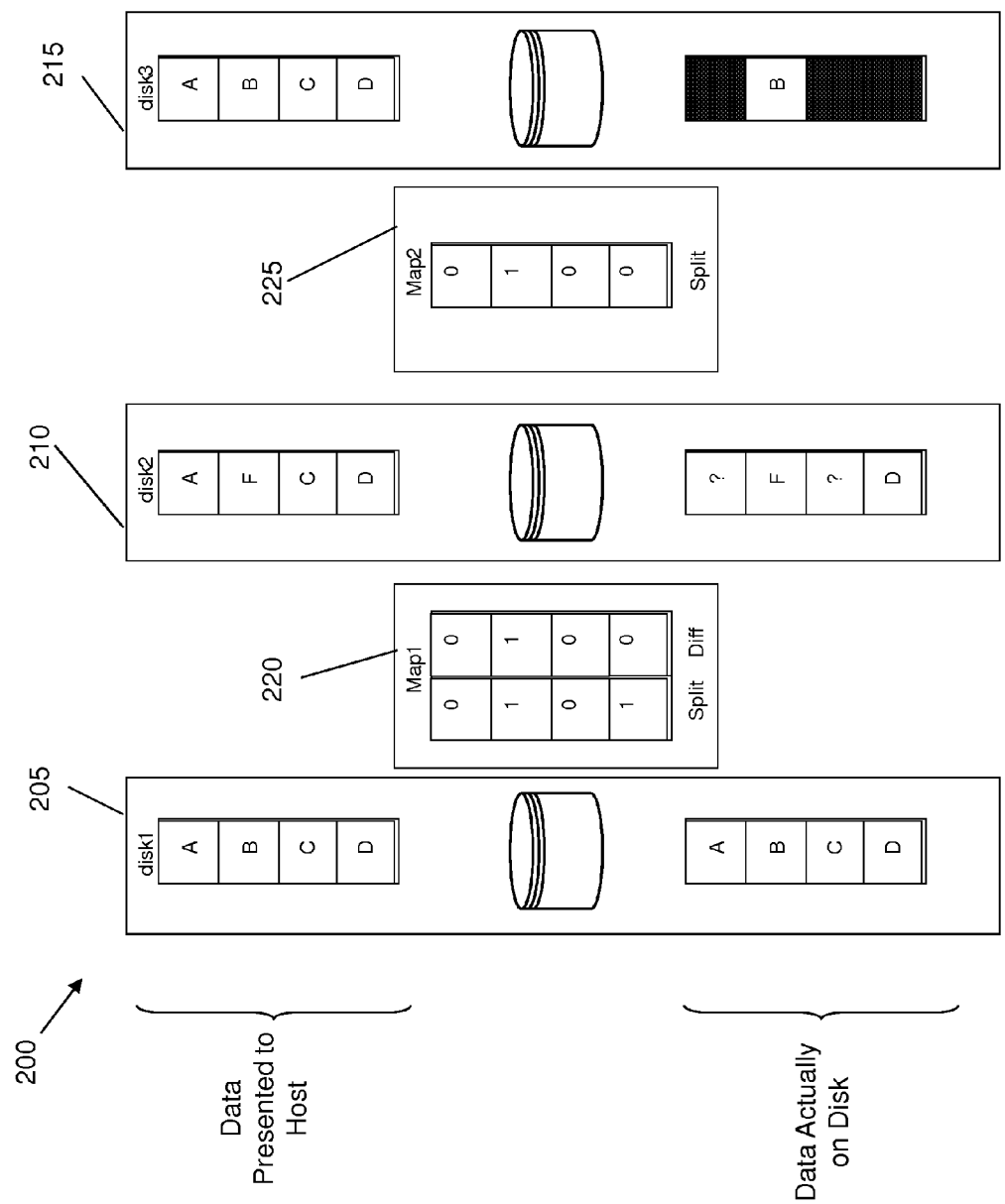
FIGS. 2-6 show exemplary FlashCopy cascades in accordance with aspects of the invention.

FIG. 2 shows an exemplary cascade of two maps in accordance with aspects of the invention. More specifically, FIG. 2 shows representations of three disks 205, 210 and 215. As illustrated in FIG. 2, the upper portions of the disks indicate data that is presented to, e.g., a host, from the respective disks, and the lower portions of the representations of the disks indicate the data that is actually contained on the respective disks. Thus, disk one 205 presents four grains (or tracks) of data A, B, C, D to a user and actually has those grains A, B, C, D stored on disk one 205. In contrast, disk two 210 presents four grains of data A, F, C, D to a user. However, as shown in the bottom portion of disk two 210, disk two 210 actually only has stored thereon grains two and four (F and D, respectively) and relies upon data stored in disk one 205 to present the host with grains one and three (A and C, respectively).

Moreover, disk one 205 and disk two 210 are each fully allocated disks. That is, as discussed above with fully allocated disks (i.e., without space-efficient volumes), the Flash-Copy function requires that all the space on a target volume be allocated and available even if no data is copied there. Thus, as shown in FIG. 2, even though disk two 210 does not contain actual copies of grains A and C therein, space for those grains is allocated (as indicated by the question marks).

Further, as shown in the example of FIG. 2, disk three 215 is a space efficient disk. That is, as explained above, with a space efficient disk, storage space is allocated on an "as-needed" basis by using space on a target volume only when it actually copies tracks (or grains) from the source volume to the target volume. Thus, as shown in FIG. 2, disk three 215 only has allocated space for grain B (as indicated by the blacked-out portions of the representation of the data stored on disk three 215).

As additionally shown in FIG. 2, map one 220 is an incremental map between disk one 205 and disk two 210. That is, map one 220 includes a split bitmap (split) and a difference bitmap (difference). According to aspects of the invention, the split bitmap is used in a FlashCopy process to track the location of the data. More specifically, a "0" in the split bitmap indicates that the data is located on the source disk and a "1" in the split bitmap indicates that the data is located on the target disk. Furthermore, the difference bitmap used in a FlashCopy process to track the differences between the source and target disks, e.g., virtual disks. More specifically, a "0" in the difference bitmap indicates there is no difference between the data located on the source disk and the target disk, and a "1" in the difference bitmap indicates that there is a difference between the data located on the source disk and the data located on the target disk.

Thus, referring to the example of FIG. 2, the split bitmap of map one 220 indicates that grains A and C are located on the source disk (disk one 205) and grains F and D are located on the target disk (disk two 210). Moreover, the difference bitmap of map one 220 indicates that there is no difference for grain one, grain three and grain four between the source disk (disk one 205) and the target disk (disk two 210). That is grains one, three and four remain the same between the source disk and the target disk, i.e., A, C and D, respectively. However, the difference bitmap of map one 220 indicates that there is a difference for grain two between the source disk (disk one 205) and the target disk (disk two 210). That is, as shown in FIG. 2, grain two has been changed from B one disk one 205 to F on disk two 210.

Map two 225 is a map between disk two 210 and disk three 215. Moreover, map two 225 is not an incremental map, and only shows a split bitmap. However, with a non-incremental map, the split bitmap and the difference bitmap will be the same. Thus, only the split bitmap is shown. However, it should be understood, that in embodiments, both the split bitmap and the difference bitmap may be explicitly indicated by a map.

As should be understood, map two 225 indicates that grains one, three and four (A, C and D, respectively) are located on the source disk (disk two 210) and grain two (B) is located on the target disk (disk three 215). Moreover, map two 225 also indicates that grains one, three and four (A, C and D, respectively) are the same between the source disk (disk two 210) and the target disk (disk three 215) and grain two is not the same between the source disk (disk two 210) and the target disk (disk three 215).

Cleaning Process

A disadvantage of the cascaded implementation over a traditional implementation is that it generates additional dependencies between the target disks. To be able to satisfy read requests from one target disk, a cascaded implementation may have to read data from another target disk in the cascade. Consequently, if a user wishes to stop and delete a FlashCopy mapping that is part of a cascade, then it is first necessary to copy all the data that is required by other target disks in the cascade to another target disk. This process of copying data is called cleaning. Whilst in this state, the target disk of the map being removed cannot be accessed in order to guarantee the cleaning operation completes. Only when the target disk is clean can a map be stopped and then deleted.

Thus, as shown in FIG. 2, two grains have been copied from disk one 205 to disk two 210. However, only the second grain on disk three 215 has been allocated. Now in order to remove map one 220 from the cascade it must be ensured that disk three 215 can maintain the image it presents to the hosts before removing disk two 210. So, given that map one 220 is incremental, as discussed above, the bitmap tool 30 determines that grain 4 (D) is the same on disk one 205 as disk two 210.

Thus, in accordance with aspects of the invention, with this exemplary scenario, no grains need to be copied from disk two 210 to disk three 215 before disk two 210 can be removed from the cascade. That is, with conventional approaches not utilizing the incremental map in a cleaning process, a decision to clean or not would be based on the split bitmap. Thus, with this example, as the split bitmap of map one 220 indicates that disk two contains grain D, using the conventional approach, space would be allocated on disk three 215 for grain D, and grain D would be copied from disk two 210 to disk three 215. However, by implementing the present invention, the bitmap tool 30 can determine that the cleaning of grain D is not necessary, and thus, can be avoided.

The advantages of avoiding a cleaning process may be two-fold. First, time and resources are not consumed by avoiding an unnecessary cleaning process. Moreover, space on a downstream space efficient disk is not unnecessarily utilized for storage of data that is accessible elsewhere. This allows this space on the space efficient disk to be utilized for other purposes, e.g., storing other grains or data.

Figure 3:
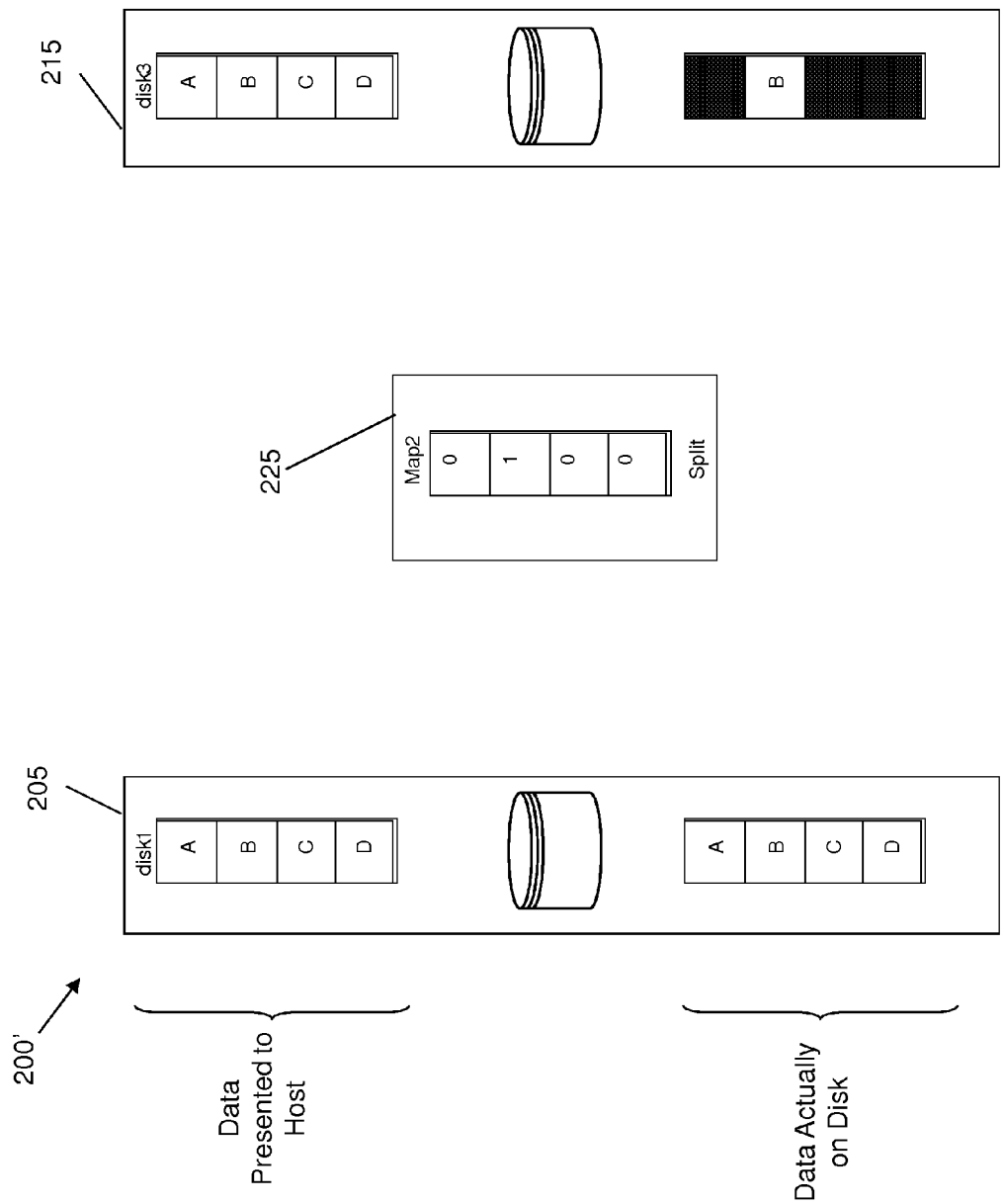

FIG. 3 shows an example 200' of the exemplary cascade 200 shown in FIG. 2 after map one has been removed from the cascade and disk two has been removed. As shown in FIG. 3, map two 225 remains, however, map two 225 is now a map between disk one 205 and disk three 215. Moreover, as shown in FIG. 3, with this example, it is not necessary for the bitmap tool 30 to modify map two 225 for map two 225 to serve as a map between disk one 205 and disk three 215.

Figure 4:
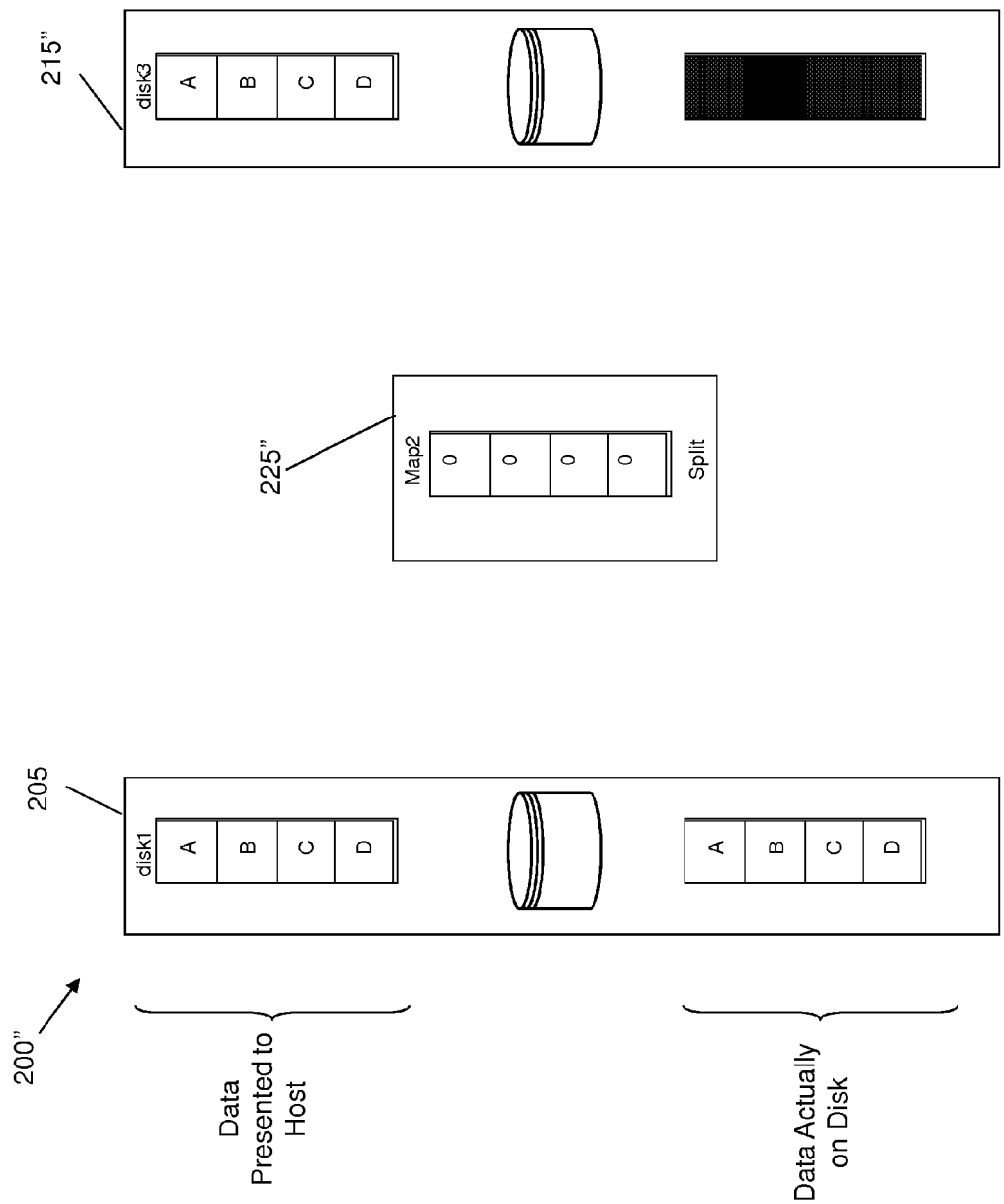

FIG. 4 shows a further example 200" of the exemplary cascade 200 shown in FIG. 2 after map one has been removed from the cascade and disk two has been removed. In embodiments, the invention contemplates that it may be desirable to maximize free space on a space efficient disk. As shown in FIG. 4, disk three 215" is presenting the same data to a host as contained on disk one 205. As such, grain two (B) of disk three 215" need not remain on disk three (as shown in FIG. 3), as that data is contained on disk one 205. Thus, in accordance with aspects of the invention, as shown in FIG. 4, the bitmap tool 30 has removed grain two (B) from disk three 215". By removing grain two from disk three 215", space previously allocated for grain two may be made available for, e.g., storing other data.

Furthermore, as shown in FIG. 4, the bitmap tool (shown in FIG. 1) has modified map two 225" from map two 225 shown in FIG. 2. More specifically, the bitmap tool has modified the split bitmap of map two 225" to now contain a zero for grain two, indicating disk three 215" no longer contains a copy of grain two (B), but relies on the copy of grain two contained in disk one 205. This is in contrast to FIG. 3, where disk three maintains its own copy of grain two (B) and no change to map two 225 is required. Moreover, as shown in the example of FIG. 4, map two 225" now maps all of its grains to disk one 205 as indicated by the zeros in map two 225".

Figure 5:
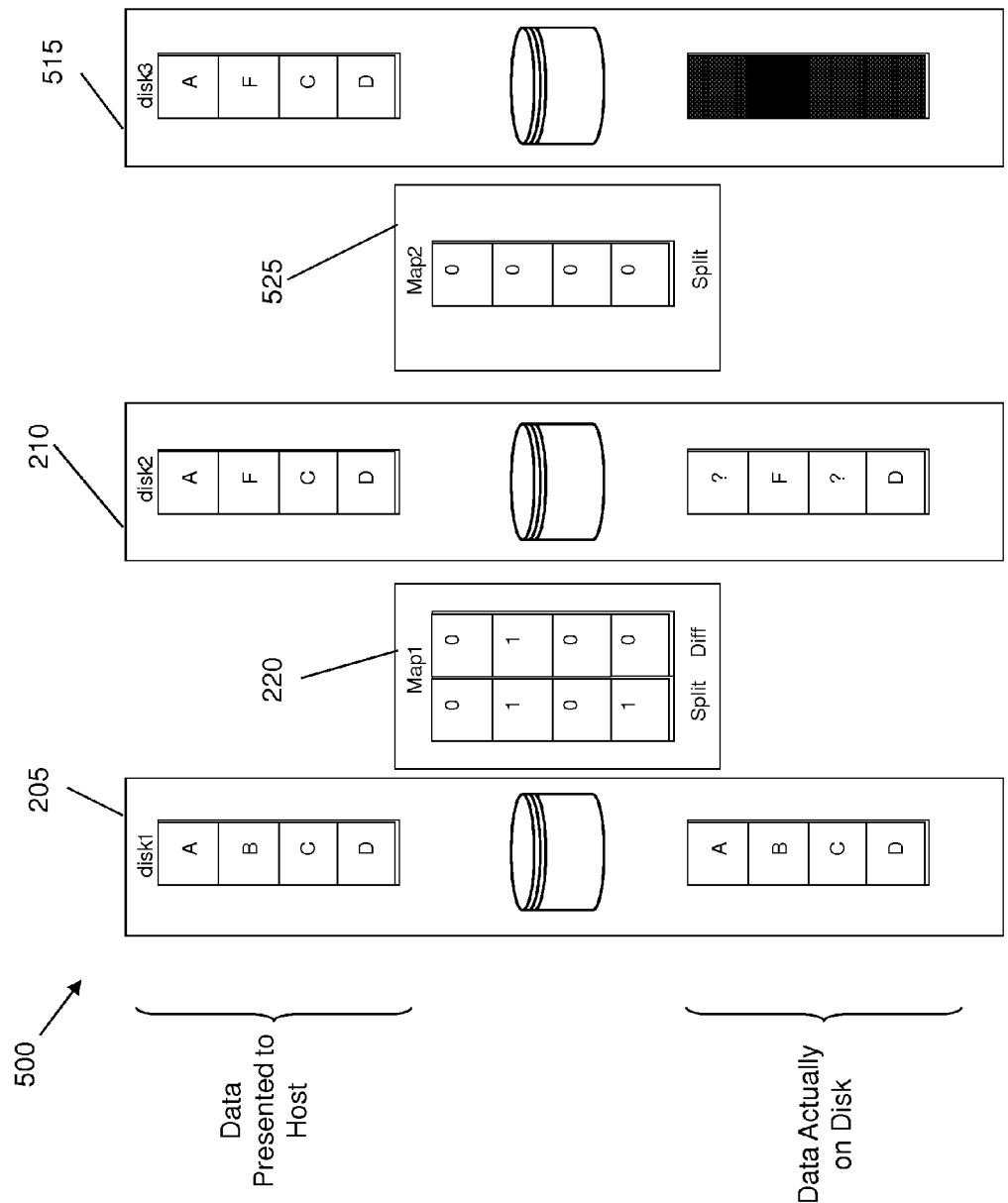

FIG. 5 shows an additional exemplary cascade of two maps in accordance with aspects of the invention. More specifically, FIG. 5 shows representations of three disks 205, 210 and 515. Disk one 205 presents four grains of data A, B, C, D to a user and actually has those grains A, B, C, D stored on disk one 205. In contrast, disk two 210 presents four grains of data A, F, C, D to a user. However, as shown in the bottom portion of disk two 210, disk two 210 actually only has stored thereon grains two and four (F and D, respectively) and relies upon data stored in disk one 205 to present the host with grains one and three (A and C, respectively).

Further, as shown in the example of FIG. 5, disk three 515 is a space efficient disk. That is, as explained above, with a space efficient disk, storage space is allocated on an "as-needed" basis by using space on a target volume only when it actually copies tracks from the source volume to the target volume. Thus, as shown in FIG. 5, disk three 515 has no space allocated for any grains (as indicated by the blacked-out portions of the representation of the data stored on disk three 515). Moreover, as indicated by map two 525, disk three relies on disk two 210 for all of the grains presented to a host. Thus, grain two (F) and grain four (D) are provided by disk two 210. Furthermore, as disk two relies on disk one 205 for grain one (A) and grain three (C), as indicated by map one 220, disk three 515 relies on the copies of grain one (A) and grain three (C) contained in disk one 205.

Now in order to remove map one 220 (which is an incremental map) from the cascade the bitmap tool ensures that disk three 515 can maintain the image it presents to the hosts before removing disk two 210. So, given that map one 220 is incremental, as discussed above, the bitmap tool can determine that grain four (D) is the same on disk one 205 as disk two 210. Thus, as discussed above, in accordance with aspects of the invention, resources are saved by not copying grain four (D) to the downstream disk (disk three 215)

However, grain two is not the same on disk one 205 as disk two 210. Thus, in accordance with aspects of the invention, with this exemplary scenario, the bitmap tool commences a FlashCopy process, wherein grain two (F) is copied from disk two 210 to disk three 515 before map one 220 is removed from the cascade and disk two 210 is removed.

Figure 6:
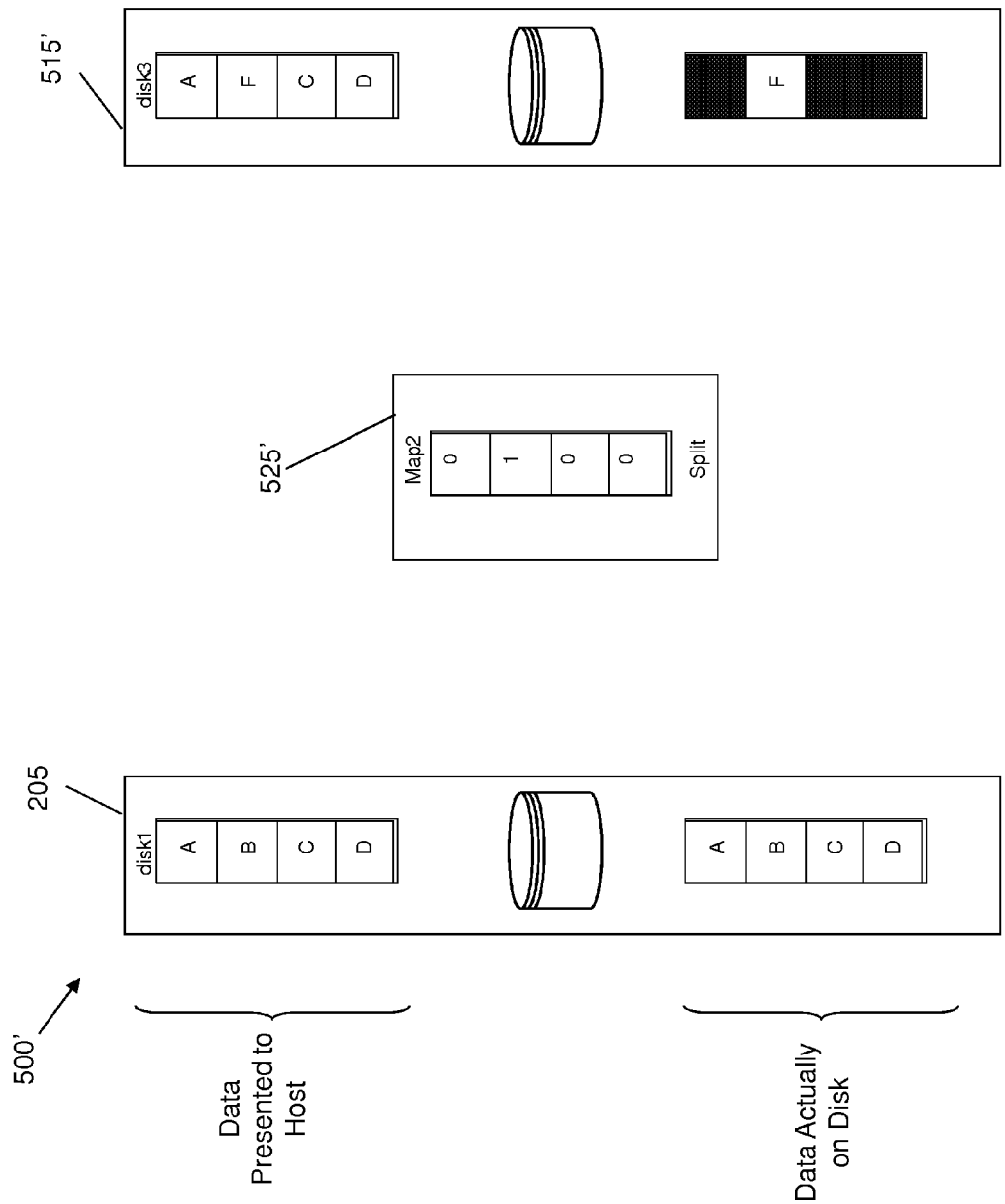

FIG. 6 shows an example 500' of the exemplary cascade 500 shown in FIG. 5 after the bitmap tool 30 has removed map one from the cascade and disk two has been removed. As shown in FIG. 6, map two 525' remains, however, map two 525' is now a map between disk one 205 and disk three 515'. Moreover, as shown in FIG. 6, with this example, it is necessary for the bitmap tool 30 to modify map two 525' for map two 525' to serve as a map between disk one 205 and disk three 515'. That is, disk three 515' now contains its own copy of grain two (F), as disk one 205 does not contain this data. Accordingly, as shown in FIG. 6, the bitmap tool 30 has modified map two 525' to reflect that disk three 515' contains a copy of grain two (F) and that grain two of disk three 515' is different than grain two of disk one 205.

Thus, in accordance with aspects of the invention, using the incremental maps not only is the work required to complete the clean operation decreased, but the minimum number of grains to be allocated on a downstream space efficient disk, e.g., disk three 515' is ensured.

General Rules

Moreover, in accordance with aspects of the invention, general rules may be followed for determining if a grain needs to be cleaned. More specifically, the bitmap tool 30 utilizes the incremental map values to determine if a target disk for a map to be removed from a cascade has data on it that cannot be obtained upstream of the target disk. Moreover, the bitmap tool 30 may utilize the incremental maps to determine if a downstream disk (relative to the target disk of the map to be removed) already has a copy of the data that cannot be obtained upstream of the target disk of the map to be removed. Furthermore, if the downstream disk does not already have a copy of the data, then in accordance with aspects of the invention, the bitmap tool copies this data from the target disk of the map to be removed to the downstream disk prior to removing the map from the cascade.

Thus, in accordance with aspects of the invention, referring to the bitmap of the map that is to be removed, a difference bitmap value of zero and a split bitmap value of zero indicates that no cleaning (or copying of data from a target disk of a map that is to be removed from a cascade to a downstream disk) is necessary. Further, a difference bitmap value of one and a split bitmap value of zero indicates that no cleaning is necessary.

Moreover, a difference bitmap value of zero and a split bitmap value of one indicates that cleaning may be necessary. In this scenario, the next upstream map is used to determine whether cleaning is necessary. That is, if the bitmap tool determines that the next upstream map has a split bitmap value of one and difference bitmap value of one then the grain must be cleaned. Otherwise, the grain does not need to be cleaned. Moreover, if there is no upstream map, then a split bitmap value of one and difference bitmap value of zero and no need for cleaning may be assumed.

Lastly, a difference bitmap value of one and a split bitmap value of one indicates that cleaning (or copying of data from a target disk of a map that is to be removed from a cascade to a downstream disk) is necessary if the downstream disk does not already contain a copy of the data. It should be noted that, as discussed above, if a map is not incremental then the difference bit value is equal to the split bit value.

Thus, referring again to FIG. 2, it can be observed that grain two of map one 220 has a difference bitmap value of one and a split bitmap value of one. Thus, these values of the incremental bitmap indicate that cleaning (or copying of data from a target disk of a map that is to be removed from a cascade to a downstream disk) is necessary if the downstream disk does not already contain a copy of the data. However, as can be observed in FIG. 2, downstream disk three 215 already contains a copy of "B," as indicated by grain two of map two 225.

Thus, as shown in FIG. 3, map one 220 and disk two 210 have been removed from the cascade. Moreover, in accordance with aspects of the invention, no cleaning (or copying of data to the target disk) was required as the target disk, e.g., disk three 215 already contained a copy of the data, e.g., "B."

In contrast, referring again to FIG. 5, it can be observed that grain two of map one 220 has a difference bitmap value of one and a split bitmap value of one. Thus, these values of the incremental bitmap indicate that cleaning (or copying of data from a target disk of the map that is to be removed from a cascade to a downstream disk) is necessary if the downstream disk does not already contain a copy of the data. Moreover, as can be observed in FIG. 5, downstream disk three 515 does not contain a copy of grain F, as indicated by grain two of map two 525.

Thus, as shown in FIG. 6, map one 220 and disk two 210 have been removed from the cascade. Moreover, in accordance with aspects of the invention, prior to the removal of map one 220 from the cascade and the removal of disk two 210, a cleaning process has occurred wherein data from disk two 210 has been copied to downstream disk three 515'. Furthermore, as shown in FIG. 5, the bitmap tool 30 has updated map two 525' to reflect that disk three 515' now contains its own copy of grain F.

Moreover, it should be understood that the present invention can be extended to any cascade because the general rules above indicate that a read to a particular grain would be the same whether or not the cleaning map is there or not.

Flow Diagram

Figure 7:
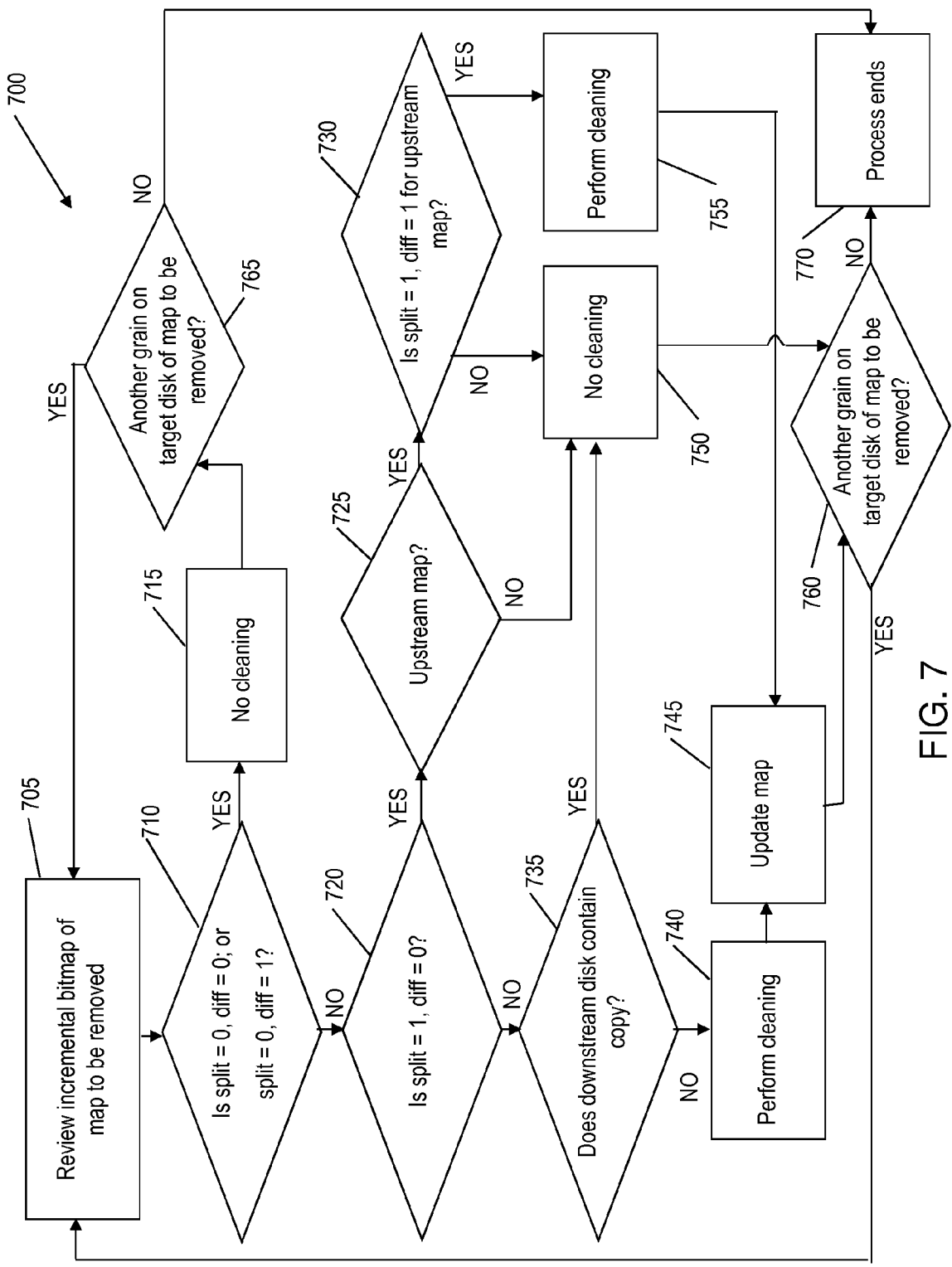
FIG. 7 shows an exemplary flow for practicing aspects of the present invention.

FIG. 7 shows an exemplary flow for performing aspects of the present invention. The steps of FIG. 7 may be implemented in the environment of FIG. 1, for example. The flow diagram may equally represent a high-level block diagram of the invention. The flowchart and/or block diagram in FIG. 7 illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

As shown in the exemplary flow 700 of FIG. 7, at step 705 the bitmap tool reviews an incremental bitmap of a map to be removed. At step 710, the bitmap tool determines if the split/difference bitmap is either 0/0 or 0/1, respectively, for a particular grain on the target disk. If, at step 710, the bitmap tool determines a split/difference bitmap is either 0/0 or 0/1, then, at step 715, the bitmap tool does not perform a cleaning. Additionally, at step 765, the bitmap tool determines if there is another grain on the target disk of the map to be removed. If, at step 765, the bitmap tool determines that there is another grain on the target disk of the map to be removed, then the process proceeds to step 705. If, at step 765, the bitmap tool determines that there is not another grain on the target disk of the map to be removed, then the process ends at step 770.

If, at step 710, the bitmap tool determines a split/difference bitmap is neither 0/0 nor 0/1, then the process proceeds to step 720. At step 720, the bitmap tool determines if the split/difference bitmap is 1/0, respectively, for the particular grain on the target disk of the map to be removed. If, at step 720, the bitmap tool determines that the split/difference bitmap is 1/0 for the particular grain on the target disk, then the process proceeds to step 725. If, at step 720, the bitmap tool determines that the split/difference bitmap is not 1/0 for the particular grain on the target disk, then it can be assumed that the split/difference bitmap is 1/1, and the process proceeds to step 735.

At step 725, the bitmap tool determines if there is an upstream map in the cascade. If, at step 725, the bitmap tool determines that there is an upstream map, at step 730, the bitmap tool determines if the split/difference is 1/1 for the particular grain on the upstream map. If, at step 730, the bitmap tool determines the split/difference is 1/1 for the particular grain on the next upstream map, then at step 755, the bitmap tool performs a cleaning of that particular grain, by copying the grain from the target disk of the map to be removed to the downstream disk. Additionally, at step 745 the map is updated to reflect the data now contained on the downstream disk. If, at step 730, the bitmap tool determines if the split/difference is not 1/1 for the particular grain on the next upstream map, then, at step 750, the bitmap tool does not perform a cleaning. If, at step 725, the bitmap tool determines that there is not an upstream map, at step 750, the bitmap tool does not perform a cleaning, and the process proceeds to step 760.

At step 735, the bitmap tool determines if the downstream disk contains a copy of the grain. If, at step 735, the bitmap tool determines the downstream disk does contain a copy of the grain, then the process proceeds to step 750. If, at step 735, the bitmap tool determines the downstream disk does not contain a copy of the grain, then the process proceeds to step 740. At step 740, a cleaning is performed, whereby the grain is copied from the target disk of the map to be removed to the downstream disk. At step 745, the map is updated to reflect the data now contained on the downstream disk, and the process proceeds to step 760.

At step 760, the bitmap tool determines if there is another grain on the target disk of the map to be removed. If, at step 760, the bitmap tool determines that there is another grain on the target disk of the map to be removed, then the process proceeds to step 705. If, at step 760, the bitmap tool determines that there is not another grain on the target disk of the map to be removed, then the process ends at step 770.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method comprising:
    determining whether a target volume contains data unavailable to a downstream volume from an upstream volume, wherein the target volume, the downstream volume, and the upstream volume comprise a cascade of volumes related by a plurality of data mappings;
    determining whether the downstream volume has a copy of the data;
    copy the data from the target volume to the downstream volume based on a determination that the target volume contains data unavailable to the downstream volume from the upstream volume and based on a determination that the downstream volume does not have the copy of the data;
    refraining from copying the data from the target volume to the downstream volume based on a determination that the target volume does not contain data unavailable to the downstream volume from the upstream volume or based on a determination that the downstream volume does have the copy of the data; and
    removing from the plurality of data mappings a first data mapping that relates the upstream volume with the target volume, wherein:
    the first data mapping comprises a split bit map that stores a plurality of values corresponding respectively to a plurality of grains of data contained in the cascade;
    each of the plurality of values stored in the split bit map indicates whether a copy of respective one of the plurality of grains of data is contained on the target volume;
    the first data mapping further comprises a difference bit map that stores a plurality of values corresponding respectively to the plurality of grains of data stored in the cascade; and
    each the plurality of values stored in the difference bit map indicates whether a respective one of the plurality of grains contained on the target volume is different from the respective one of the plurality of grains contained on the upstream volume.

2. The method of claim 1, further comprising updating a second data mapping of the plurality of data mappings to map the downstream volume to a new source volume.

3. The method of claim 1, wherein the upstream volume and the target volume are fully-allocated volumes in which all the storage space is allocated and available.

4. The method of claim 3, wherein the downstream volume is a space efficient disk.

5. The method of claim 4, further comprising allocating a minimum necessary number of grains on the space efficient disk.

6. A system, comprising:
    a processor, a computer readable memory and a computer readable storage device;
    a cascade of storage volumes related by a plurality of data mappings;
    first program instructions that determine to clean the cascade based on the values stored in a first mapping of the plurality of mappings;
    second program instructions that modify values stored in a second mapping of the plurality of mappings, the second mapping corresponding to a storage volume that is downstream in the cascade from the first mapping; and
    third program instructions that remove the first mapping from the cascade;
    wherein each of the first, second, and third program instructions are stored on the computer readable storage device for execution by the processor via the computer readable memory, wherein:
    the first data mapping comprises a split bit map that stores a plurality of values corresponding respectively to a plurality of grains of data contained in the cascade;
    each of the plurality of values stored in the split bit map indicates whether a copy of respective one of the plurality of grains of data is contained on the downstream volume;
    the first data mapping comprises a difference bit map that stores a plurality of values corresponding respectively to the plurality of grains of data stored in the cascade; and
    each the plurality of values stored in the difference bit map indicates whether a respective one of the plurality of grains contained on the downstream volume is different from a respective one of a plurality of grains contained on an upstream volume.

7. The system of claim 6, wherein the downstream volume is a space efficient disk.

8. The system of claim 7, wherein the system is configured to allocate a minimum necessary number of grains on the space efficient disk.

9. A computer program product comprising a computer usable storage device having readable program code embodied in the storage device, the computer program product includes at least one component operable to:
    determine whether a target volume contains data unavailable to a downstream volume from an upstream volume, wherein the target volume, the downstream volume, and the upstream volume comprise a cascade of volumes related by a plurality of data mappings;
    determine whether the downstream volume has a copy of the data;
    copy the data from the target volume to the downstream volume when it is determined that the target volume of the map contains data unavailable to the downstream volume from the upstream volume and the downstream volume does not have the copy of the data;

refrain from copying the data from the target volume to the downstream volume when it is determine that the target volume of the map does not contain data unavailable to the downstream volume from the upstream volume or the downstream volume does have the copy of the data; and remove from the plurality of data mappings a first data mapping that relates the upstream volume with the target volume, wherein:

the first data mapping comprises a split bit map that stores a plurality of values corresponding respectively to a plurality of grains of data contained in the cascade;

each of the plurality of values stored in the split bit map indicates whether a copy of respective one of the plurality of grains of data is contained on the target volume;

the first data mapping further comprises a difference bit map that stores a plurality of values corresponding respectively to the plurality of grains of data stored in the cascade; and each the plurality of values stored in the difference bit map indicates whether a respective one of the plurality of grains contained on the target volume is different from the respective one of the plurality of grains contained on the upstream volume.

10. The computer program product of claim 9, wherein the at least one component is further operable to update a second data mapping of the plurality of data mappings to reflect a mapping from the downstream volume to a new source volume when the copying the data from the target volume to the downstream volume is performed.

11. The computer program product of claim 9, wherein the downstream volume is a space efficient volume.

12. The computer program product of claim 11, wherein the at least one component is further operable to allocate a minimum necessary number of grains on the space efficient volume.

* * * * *